United States Patent
Padgett et al.

(10) Patent No.: US 8,733,765 B2
(45) Date of Patent: May 27, 2014

(54) AIRPORT DIVESTMENT AND LUGGAGE CART

(75) Inventors: John M. Padgett, Clermont, FL (US); Michelle G. Bentubo, Orlando, FL (US); Harold J. Kennedy, Orlando, FL (US); Seth T. Abbe, Clermont, FL (US)

(73) Assignee: Disney Enterprises, Inc., Burbank, CA (US)

(*) Notice: Subject to any disclaimer, the term of this patent is extended or adjusted under 35 U.S.C. 154(b) by 353 days.

(21) Appl. No.: 13/235,721

(22) Filed: Sep. 19, 2011

(65) Prior Publication Data
US 2013/0069326 A1 Mar. 21, 2013

(51) Int. Cl.
*B62B 3/14* (2006.01)

(52) U.S. Cl.
USPC ............................ 280/33.997; 280/47.35

(58) Field of Classification Search
USPC ............ 280/33.991, 33.992, 33.996, 33.997, 280/47.34, 47.35
See application file for complete search history.

(56) References Cited

U.S. PATENT DOCUMENTS

| | | | | |
|---|---|---|---|---|
| 3,813,111 | A * | 5/1974 | Ruger | 280/33.991 |
| 3,894,748 | A * | 7/1975 | Ratcliff | 280/641 |
| 4,381,870 | A * | 5/1983 | Muellner | 280/33.993 |
| 4,721,317 | A * | 1/1988 | Avot | 280/33.995 |
| 4,813,701 | A * | 3/1989 | Balland | 280/641 |
| 5,149,114 | A * | 9/1992 | Lewandowski et al. | 280/33.992 |
| 5,199,728 | A * | 4/1993 | Hutchison | 280/33.992 |
| 5,366,123 | A * | 11/1994 | Range | 224/411 |
| 5,409,245 | A * | 4/1995 | Kern et al. | 280/33.996 |
| 5,553,876 | A * | 9/1996 | Trubiano | 280/33.991 |
| 5,595,394 | A * | 1/1997 | Adamson | 280/33.993 |
| 5,595,395 | A * | 1/1997 | Wilson | 280/47.26 |
| 5,662,342 | A * | 9/1997 | Basharat | 280/33.997 |
| 6,131,926 | A * | 10/2000 | Harlan | 280/47.26 |
| D465,633 | S | 11/2002 | Le Marchand | |
| 6,536,786 | B1 * | 3/2003 | Katoozian | 280/33.993 |
| 6,669,212 | B2 * | 12/2003 | Porter | 280/33.991 |
| 6,955,363 | B2 * | 10/2005 | Libretti et al. | 280/33.993 |
| 7,055,847 | B2 * | 6/2006 | Miller et al. | 280/638 |
| 7,168,714 | B2 * | 1/2007 | Gibbs | 280/47.34 |
| 7,448,476 | B2 * | 11/2008 | Otterson | 188/19 |
| 7,660,388 | B2 * | 2/2010 | Gray | 378/57 |
| 7,703,776 | B1 | 4/2010 | Nugent | |
| 7,717,440 | B1 | 5/2010 | Baba | |
| 7,722,058 | B2 * | 5/2010 | Giampavolo | 280/33.991 |

(Continued)

FOREIGN PATENT DOCUMENTS

DE 3909078 A1 * 6/1990 ............ B62B 3/00

*Primary Examiner* — Katy M Ebner
(74) *Attorney, Agent, or Firm* — Marsh Fischmann & Breyfogle LLP; Kent A. Lembke

(57) ABSTRACT

An airport cart adapted for carrying carry-on luggage and personal items divested prior to a security check point. The cart includes a lower luggage tray or shelf, and a pair of vertical supports extends upward from a rear portion of this tray or a horizontal portion of the cart frame. The cart may have dual handles extending rearward in a space-apart manner from the vertical supports such that the handles are parallel to each other and do not block vertical loading of the luggage tray. The cart includes one, two, or more storage or security screening bins that are affixed to or detachably mounted on the vertical supports or the handles. One or more of the storage bins may be compatible with conventional airport screening bins. The bins are horizontally offset from the luggage tray and each other to facilitate unobstructed 3D screening of bags and items in the bins.

14 Claims, 9 Drawing Sheets

(56) References Cited

U.S. PATENT DOCUMENTS

| | | | |
|---|---|---|---|
| 8,066,291 B2* | 11/2011 | Cagan et al. | 280/33.991 |
| 8,075,017 B2* | 12/2011 | Ignacio | 280/642 |
| 8,564,401 B2* | 10/2013 | Padgett et al. | 340/5.6 |
| 2002/0067027 A1* | 6/2002 | Anderson | 280/655 |
| 2003/0090073 A1* | 5/2003 | Whang | 280/33.991 |
| 2005/0012286 A1* | 1/2005 | Woodrow | 280/47.35 |
| 2005/0040614 A1* | 2/2005 | Johnson et al. | 280/33.991 |
| 2009/0033067 A1* | 2/2009 | Coelho et al. | 280/651 |
| 2009/0058025 A1* | 3/2009 | Rolim De Oliveira | 280/33.992 |
| 2009/0309322 A1* | 12/2009 | Selvig et al. | 280/33.996 |
| 2010/0158191 A1* | 6/2010 | Gray | 378/57 |
| 2013/0020776 A1* | 1/2013 | Taranto | 280/47.35 |

* cited by examiner

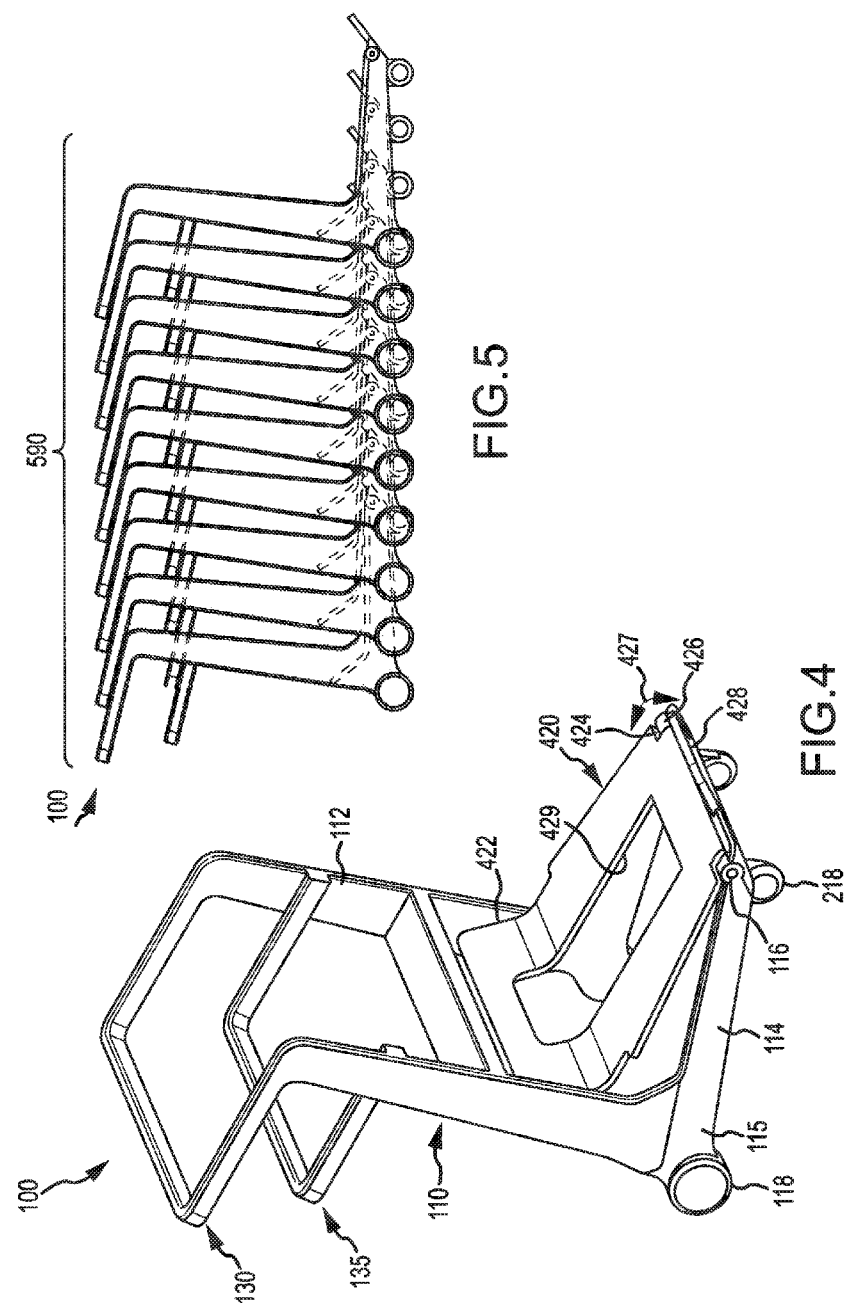

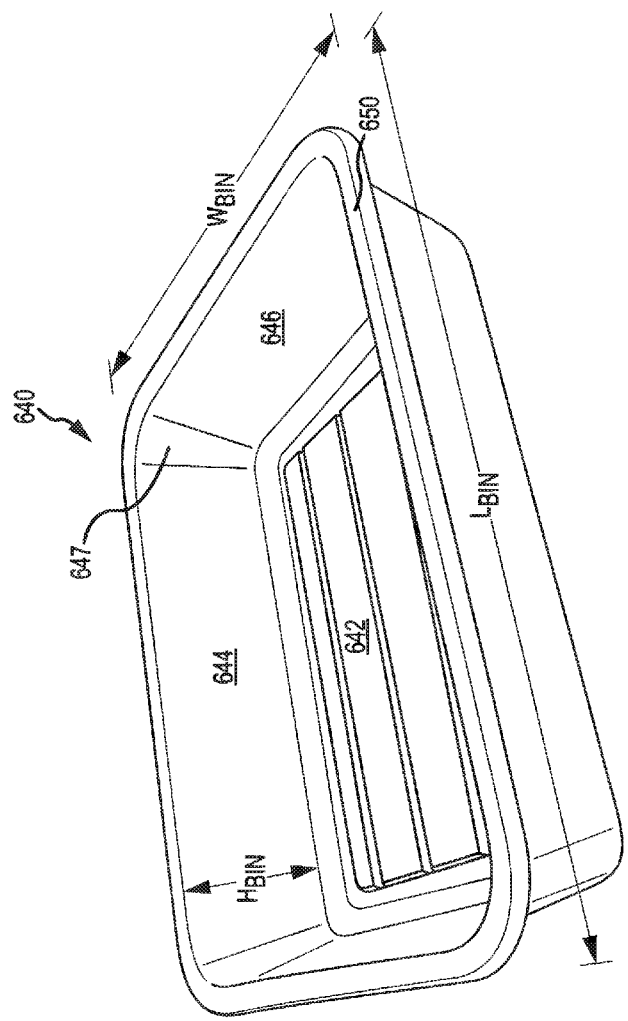

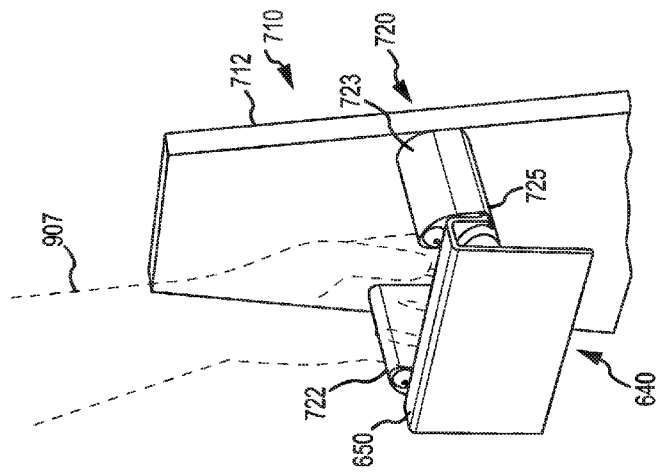
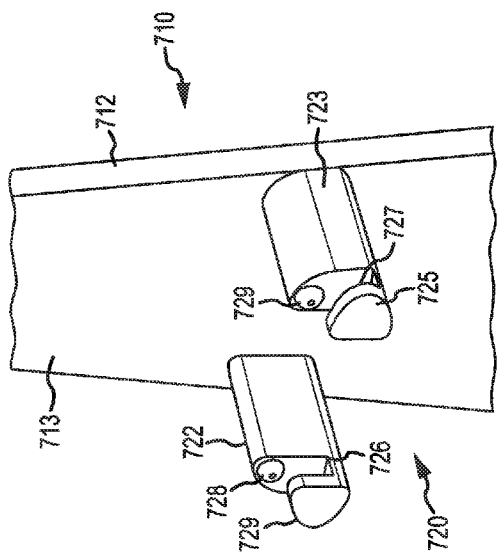
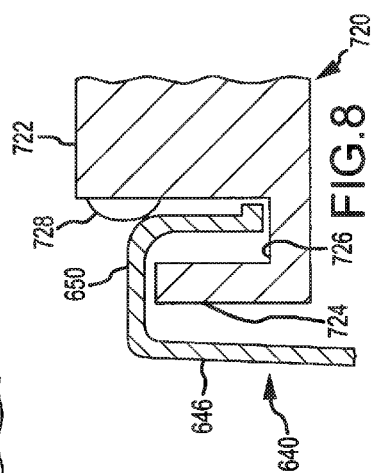

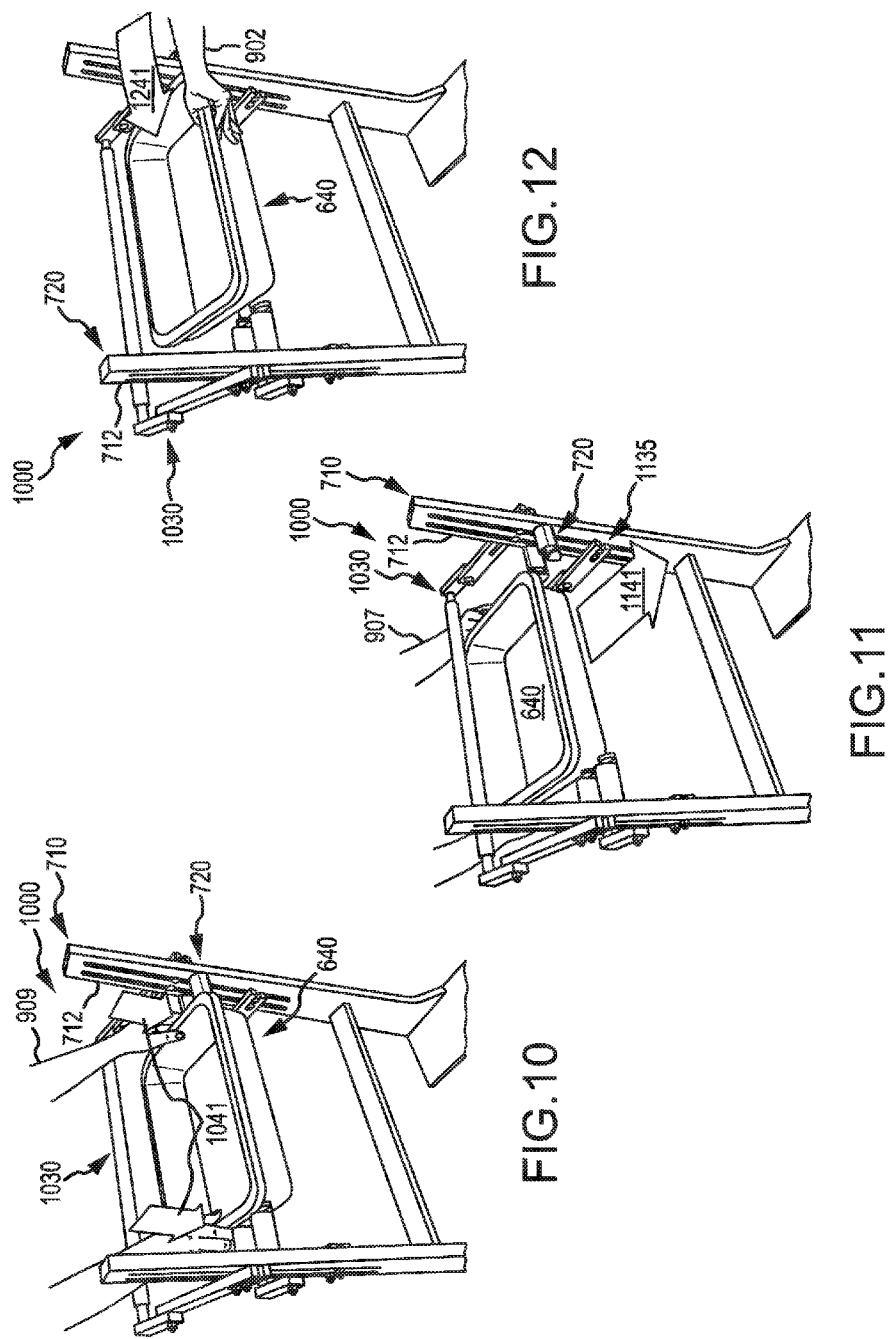

AIRPORT DIVESTMENT AND LUGGAGE CART

BACKGROUND

1. Field of the Description

The present description relates, in general, to airport security and techniques for improving the security screening process at airports in terms of efficiency and personal experience. More particularly, the present description relates to carts adapted for use in airports to facilitate a person with carry-on items and luggage to more effectively pass through airport security screening checkpoints including scanning of personal and electronic items and carry-on luggage.

2. Relevant Background

Air travel has become increasingly popular for travel from one destination to another, and, as a result, large numbers of people pass through airports. This presents a potential target for terrorism including airplane hijacking. Airport security processes have been developed to prevent harm to aircraft, passengers, and crew as well as to support national security and counter terrorism.

Generally, after obtaining an airline-issued ticket, passengers are screened through airport security into areas where the exit gates to the aircraft are located, with these areas being considered secure or sterile (or airside). Passengers are discharged from aircraft into the secure and airside areas so that they do not have to be re-screened prior to boarding a connecting, domestic flight. At the security screening checkpoint, each passenger is typically required to present a valid identification along with the ticket or boarding pass. Each passenger must also typically personally pass through a metal detector or advanced imaging technology unit while their personal items (e.g., items that may set off the metal detector) and carry-on items and luggage are passed through a scanner (e.g., an X-ray imaging device) via a conveyor belt.

Each country may have numerous security screening practices and restrictions, but each generally involves removing or divesting a number of items from your person and from your carry-on luggage to facilitate proper personal screening and scanning of carried items. Using the present restrictions in the United States as an example, passengers typically have to pass through a metal detector. Each passenger may have to remove metal objects including coins, belts, jewelry, and electronics such as phones, handheld computers, and so on from their pockets and place these in a security bin that is passed through the scanner on the conveyor belt. Additionally, the passenger is required to remove their shoes and place them in a security bin for separate scanning. If the passenger has to pass through an advanced imaging technology (AIT) device, the passenger may have to remove all items from their pockets and pass these through the separate carry-on scanner or X-ray machine.

In addition to preparing themselves, each passenger must remove certain items from their carry-on luggage prior to placing it and the removed items on the conveyor belt for X-ray scanning. For example, U.S. airport security presently requires all laptop computers, full-size video game consoles, DVD players, and video cameras to be removed from carry-on bags and submitted separately in plastic security bins for X-ray screening. The passenger also may have to remove their coats and jackets and pass these through a scanner for inspection. Further, U.S. airline passengers can only take 3 ounce or smaller containers of liquid or gel onto an aircraft, and all of these containers need to fit into a single 1 quart clear plastic, zip-top bag, and this clear plastic bag, which many use to hold all their toiletries and the like, also has to be removed from carry-on bags and placed in a security bin for scanning separate from the carry-on bag (e.g., with the passenger's shoes in one of the plastic security bins).

Anyone who has recently traveled by air understands that one of the largest delays and points of congestion occurs at the airport security checkpoint. Business and other experienced travelers are mixed with those inexperienced with air travel and with security requirements. Additionally, families traveling with smaller children typically find the airport security checkpoints particularly stressful as they must help their children through the scanning process and infants and children have to be taken out of carriers and strollers and carried through the metal detector while the carriers and strollers have to go separately through the X-ray scanner on the conveyor belt.

The process is typically very inefficient as the complete divestment process occurs in the security screening queue, with passengers trying to hurry to remove or divest all their items that have to be separately screened from their person and carry-on bags into security bins. The bins with their personal items, electronics, liquids, and the like and their carry-on luggage are then placed on the security screening belt for inspection by airport security. Many travelers will require multiple security bins for all of their items, and items will often be forgotten or last minute security requirements will be identified (e.g., trying to finish a drink, asking for a clear plastic bag, throwing away shampoo and other gels/liquids that are too large in volume, removing additional jewelry or a belt, and the like). All of these issues lead to a rushed and stress-filled experience for nearly all travelers including those who have no carry-on luggage as they are delayed by fellow travelers that, in turn, feel even more hurried by those waiting behind them in the queue. Further, these issues lead to traveler inefficiencies and problems moving smoothly through the security queue, which leads to stops and starts and idle time for scanning machines and security personnel (e.g., waiting for travelers to initially load bins and then remove additional items for scanning upon failure to pass through a metal detector or upon learning of scanning procedures at the security queue).

Hence, there remains a need for improvements that enhance the efficiency of the airport security screen process. Preferably, such improvements would allow individuals and families to more effectively pass through metal detectors and X-ray scanners in a more enjoyable manner (e.g., with less last-minute divestment, with less anxiety over meeting existing security requirements, and so on). Additionally, the improvements would preferably provide benefits to the airport operations and to efficiency and effectiveness of the security screening process. These benefits may include less congestion in security check points and increased efficiency in use of both scanning equipment and security personnel.

SUMMARY

The present description addresses the above and other problems by providing an airport divestment and luggage cart. The inventors recognized that air travelers have to carry all of their carry-on luggage through an airport, are required to complete the divestment process (e.g., preparing for personal and carry-on screening) in the security screening queue, and then load all carry-on luggage and personal items onto a security screening or conveyor belt. This process creates a great deal of stress, anxiety, and operational inefficiency especially for families with children and with little traveling experience and knowledge of the many security requirements.

To make the security scanning process more efficient and less stressful, it was determined that it would be useful to provide a cart designed specifically for use in airports. The cart is configured to allow the user (e.g., airline passenger) to complete the security divestment process away from and well before reaching the security screening queue. Such upstream or separate divestment allows them to divest their personal belongings and load/unpack their carry-on luggage at their own pace outside of the frantic security line. Passengers are then able to navigate the airport much easier with their luggage cart rather than pulling and carrying bags that are not ready for security checkpoints.

Briefly, a cart may be provided that has an all plastic and/or ceramic construction, which may be pushed directly through or moved via conveyor devices through scanners adapted for use with such carts. In such embodiments, the cart may be adapted to arrange passenger items such as laptops, liquids, and personal items in orientations and locations to achieve better scanning results, e.g., with limited blocking of sight lines to support three-dimensional (3D) X-ray scanning of the cart. In other embodiments, the cart is adapted for loading carry-on bags and, more importantly, for containing divested items in security bins or containers suited for placing upon a conveyor belt or security screening belt for passing through a security scanner.

For example, the cart may be adapted to detachably support one, two, or more security bins made of translucent or clear plastic or ceramic that may be loaded with the passengers personal items during the divestment process upstream from the security checkpoint, and the passenger may then quickly detach these bins filled with their items from the luggage cart and then place the filled bins upon the security screening belt for inspection by airport security with an X-ray or other scanner. In one embodiment, the security bins may be standard security bins used by a particular airport or may be pre-approved/authorized by airport security for use with their scanners. For example, a cart may support one or more bins of standard size and shape that the passenger uses to hold a first set of personal items such as liquid containers and a coat while a specially adapted second (or third) security bin may hold a second set of personal items such as the passenger's laptop, the passenger's cellphone, the passengers jewelry and coins, and so on. Each of these security bins may be placed upon the security screening belt, but the pre-loading of these bins (i.e., divestment process) allows the passenger to much more efficiently pass through a security check point.

Use of the airport divestment and luggage cart improves each passenger's airport experience, relieves passenger anxiety and stress with security requirements, and improves airport security screening operational efficiency. The passengers have a more relaxed and focused divestment, as well as recomposure after inspection, away from the security checkpoint that eliminates or reduces security screening belt stops and greatly reduces the number of reruns through the scanner and metal detector. The use of the carts described herein is expected to be particularly desirable for traveling families as adults are able to assist their children to comply with all security requirements in a much more relaxed and slower paced atmosphere by filling the security bins and preparing themselves and their luggage for security inspections prior to the actual scanning locations in the airports.

More particularly, a cart is provided for carrying luggage and divested personal items through an airport. The cart includes a cart frame with a lower horizontal support and a set of wheels attached to a lower surface of the lower horizontal support. The cart frame also includes a luggage tray attached to an upper surface of the lower horizontal support (e.g., pivotally attached at a forward end and adapted (such as with an interior opening or groove) for nesting of multiple carts). Further, the cart frame includes at least one vertical support extending upward from the lower horizontal support (e.g., two vertical support members or elements attached to a rear portion of the horizontal support). The cart also includes an open topped storage bin that is mounted to the vertical support so that it is positioned so as to extend rearward away from the vertical support and luggage tray. In this way, an open space is provided above the luggage tray for stacking one, two, or more bags or pieces of carry-on luggage.

In some cases, the cart may be fabricated and designed to support its being pushed through a metal detector or conveyed through other airport security scanners such as a 3D scanner. In such cases, the cart frame may be formed of one or more plastics or ceramics. In some embodiments, the open-topped storage bin is rectangular in shape with four side walls and a base, the side walls extending upward a height of at least 3 inches to a handle that extends along at least two sides of the storage bin (e.g., is identical or similar to bins accepted/used by airport security).

The cart frame may include two, spaced-apart ones of the vertical supports, and the open-topped storage bin may be detachably coupled between the vertical supports with a bin attachment assembly. Further, the attachment assembly may include, for each of the vertical supports, two spaced apart rails extending outward from an inner surface of the vertical support with a groove for receiving the handle of the storage bin. In such cases, the storage rails may be spaced apart to allow insertion of a cart user's hand (e.g., at least 4 inches apart), and the attachment assembly may be configured such that the storage bin is positionable on the rails in a forward or rearward sliding manner and from above in a vertically downward lowering manner. One bin may be provided or a second one of the open-topped storage bins may be detachably supported by the vertical supports, and, in such cases, the storage bins may be vertically stacked above each other on the cart.

In some preferred embodiments, the carts are designed for use by passengers of differing heights. Hence, upper and lower handles may be provided in the cart and extend outward from the vertical support and away from the luggage tray (e.g., the luggage tray extends forward from the vertical support(s) while the handles (that may be generally U-shaped) may extend rearward). The upper and lower handles may be spaced apart at least 6 inches (e.g., 10 inches difference in height with the lower handle being at 28 to 32 inches or the like). In some such embodiments, the cart may further include at least one storage bin attached to the lower handle (such as one configured to receive a laptop or other consumer electronic device that security identifies as requiring scanning in a separate bin). The lower handle storage bin may be rigidly affixed to the lower handle and may be horizontally offset from the open-topped storage bin and the luggage tray. In this manner, unobstructed 3D scanning is provided by the cast because in a plan view of the cart there is no overlap between the storage bins and between the storage bins and the luggage tray.

BRIEF DESCRIPTION OF THE DRAWINGS

FIG. 4 illustrates a front perspective view of the cart of FIGS. 1-3 modified to include another embodiment of an lower luggage tray or shelf shown to be pivoted upward;

FIG. 5 shows a side view of a number of the carts of FIG. 4 in a nested arrangement showing front bumpers being received in tray central grooves or openings adapted for such a purpose;

FIG. 6 is a top perspective view of an exemplary cart bin (or security bin) that may be used with a cart of the present description and that may have a similar shape, size, and/or design as a conventional or standard airport security bin;

FIG. 7 is a partial perspective view of a bin attachment assembly for use on each vertical support of a cart frame for detachably supporting a cart bin, such as the bin of FIG. 6;

FIG. 8 is a sectional view of one of the bin support rails or arms as a bin is being positioned within a receiving groove at the end of the arm/rail;

FIG. 9 illustrates the bin attachment assembly of FIGS. 7 and 8 after the bin has been dropped into place on the rails/support arms or just prior to vertical removal or lifting of the detachable bin from the rails/support arms from a cart;

FIGS. 10-12 illustrate a cart using the bin attachment assembly of FIGS. 7-9 to facilitate three types of bin attachment or loading (and, later, detachment or unloading/removal for placement on a security screening belt) including vertical attachment, rear sliding attachment, and front loading.

DETAILED DESCRIPTION ION

Embodiments of the present description are directed to a cart that may be utilized for passenger divestment of personal and separately scanned items upstream or away from the security check point and then used to move pre-sorted and arranged articles for security screening through the airport to the security check point for stress free inspection. The cart is also adapted for accommodating luggage as well as personal items such that the passenger can push one cart without having to also pull/push or carry their carry-on bags through the airport and security queues. Personal item divestment can be carried out at the passenger's own pace such as at a divestment station or area before arriving at security. In this manner, passengers arrive at security checkpoints prepared for the security screening process, which promotes consistent flow through security queues as it reduces security line holdups and congestion and makes the security checkpoints a less stressful environment.

Briefly, the cart may be thought of as an airport divestment and luggage cart that may be fabricated from plastics and/or ceramics to facilitate its components being scanned or inspected by security scanners. The use of such materials is preferred such that there is no or less interference with operation of scanning devices as would be the case with metallic components (e.g., view of scanning device is not blocked by any portion of the cart). The cart may have dual handles with an upper handle for adults and taller children and a lower handle for children. The cart supports one or more security bins, such as plastic security bins in the form of the standard security bins used in airports or with a security-accepted form factor and construction materials.

The security bin(s) is detachably attached and supported such that it can be loaded separate from the cart frame and also later removed from the cart frame to be placed upon a security screening belt or scanner conveyor belt. The cart frame further includes a lower luggage tray or shelf for receiving one, two, or more bags or pieces of luggage, and the cart may be open above at least a portion of this luggage tray/shelf (e.g., with the security bins vertically offset rearward toward the handles to provide space for stacking carry-on luggage/bags). Further, the luggage tray and cart frame may be configured to allow nesting of multiple carts for collection near a security check point, such as downstream from scanners, and for storage in the airport at a location accessible by passengers initially picking up or checking out a cart for use in the security scanning process, such as before or after ticketing.

Figure 1:
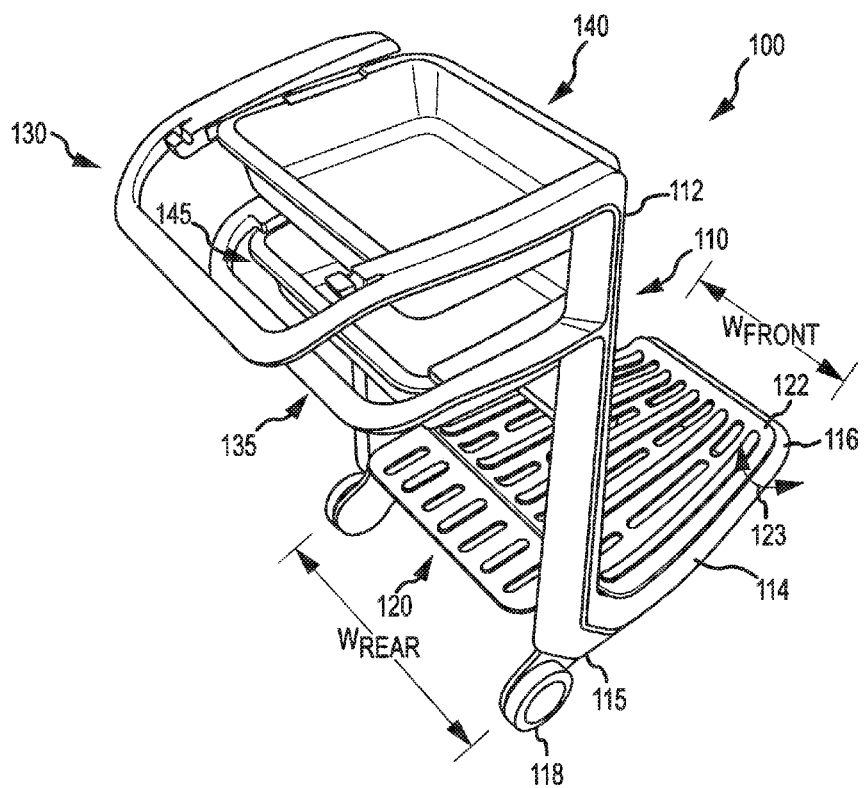
FIG. 1 is a perspective, overhead, rear view of an airport divestment and luggage cart according to one embodiment shown prior to loading during a passenger divestment process.

FIG. 1 illustrates one embodiment of an airport divestment and luggage cart 100 that may be used to facilitate the security screening process as discussed above. As shown, the cart 100 includes a cart frame 110 that may be formed of ceramics, plastics, or other non-metallic materials in cases such as in applications in which the cart 100 is passed as a unit or the frame 110 is passed through an airport security scanner. The cart frame 110 includes a pair of vertical supports 112, which are each attached at a lower or bottom end to a lower horizontal support 114 at a rear or back end 115 of the horizontal support 114 (which may also be called a tray support or mounting element of the frame 110). The horizontal support 114 may be formed with left and right arms that are connected at a front end or forward edge member 116, and the two arms maybe spaced apart to facilitate nesting and to reduce the weight and materials required for fabricating the cart 100. A pair of wheels 118, which may be fixed or non-pivoting in some cases, is supported for rotation on the horizontal support 114 near the rear end 115 to allow the cart 100 to be easily rolled by a passenger through an airport.

The cart 100 includes a luggage tray or shelf 120 that is pivotally attached, as shown with arrow 123, at a front or forward end or lip 122 to the front end 116 of the horizontal support 114. The shelf 120 is attached to the cart frame 110 to lift up or pivot 123 to allow the cart 100 to be nested with other similarly designed carts. The horizontal support 114 includes shelves/ledges or stops for receiving the tray 120 as it is pivoted 123 downward to a lowered or at rest position to support or receive luggage/bags (e.g., the outer surfaces of the tray 120 may rest on one or more portions of the support 114 along its length between the rear 115 and front 116).

To further facilitate nesting, the width, $W_{Rear}$, of the cart 100 and horizontal support 114 near the rear end 115 is wider than the wide, $W_{Front}$, of the cart and horizontal support 114 near the front end 116. In this manner, the cart 100 may receive a second cart (not shown in FIG. 1) with the second cart's front end 116 causing the tray 120 to pivot 120 upward and the horizontal support 114 to be received between the spaced apart arms of the horizontal support 114. The widths may vary in practice with the rear width, $W_{Rear}$, typically being between about 20 inches and 30 inches and the front width, $W_{Front}$, typically being less (e.g., 3 to 8 inches less) and between about 15 and 25 inches.

The cart 100 also includes dual handles for pushing the cart 100 on the wheels 118. Specifically, an upper handle 130 is provided that extends rearward (or in an opposite direction than the tray 120) from a top end of the vertical supports 112, and a lower handle 135 is also provided that extends rearward (and in a parallel manner to the handle 130) from the vertical supports 112 at an intermediate position spaced apart a distance (such as 6 to 14 inches with about 10 inches used in some case) from the mounting location of the upper handle 130. The upper handle 130 is provided for use by adults and older/taller children while the lower handle is provided for use by children, which allows the cart to be used by passengers with a wider range of heights than if only one handle were provided on the cart 100 (although such an arrangement may be desirable in some applications of the cart 100).

As shown, the cart 100 also includes two bins 140, 145 that are detachably supported so that they can be removed to ease loading of personal items during a divestment process and to allow the bins 140, 145 to also be removed from the cart 100 and placed upon a security screening belt. As shown, the bins 140, 145 may take a form that is similar to or even identical to (matching) conventional security bins in the airport in which the cart 100 will be provided to passengers. For example, in the United States, the bins 140, 145 may be similar to or actually be Transportation Security Administration (TSA) security checkpoint bins used in TSA-approved scanners. The bins 140, 145 may be supported upon the upper and lower handles, 130, 135 as shown or, in some cases, supported by bin attachments on the vertical supports 112 of frame 110. The bins 140, 145 are shown to be stacked with one bin 140 positioned directly above the second bin 145, but other embodiments of a cart 100, such as carts that are passed through a scanner without removal of the bins 140, 145, may provide supports on the frame 110 or handles 130, 135 with some amount of offset to facilitate scanning. Note, the handles 130, 135 and tray support 114 are typically rigidly affixed to the vertical support 112 such that the frame 110 is a unitary and rigid design (e.g., not collapsible).

Figure 2:
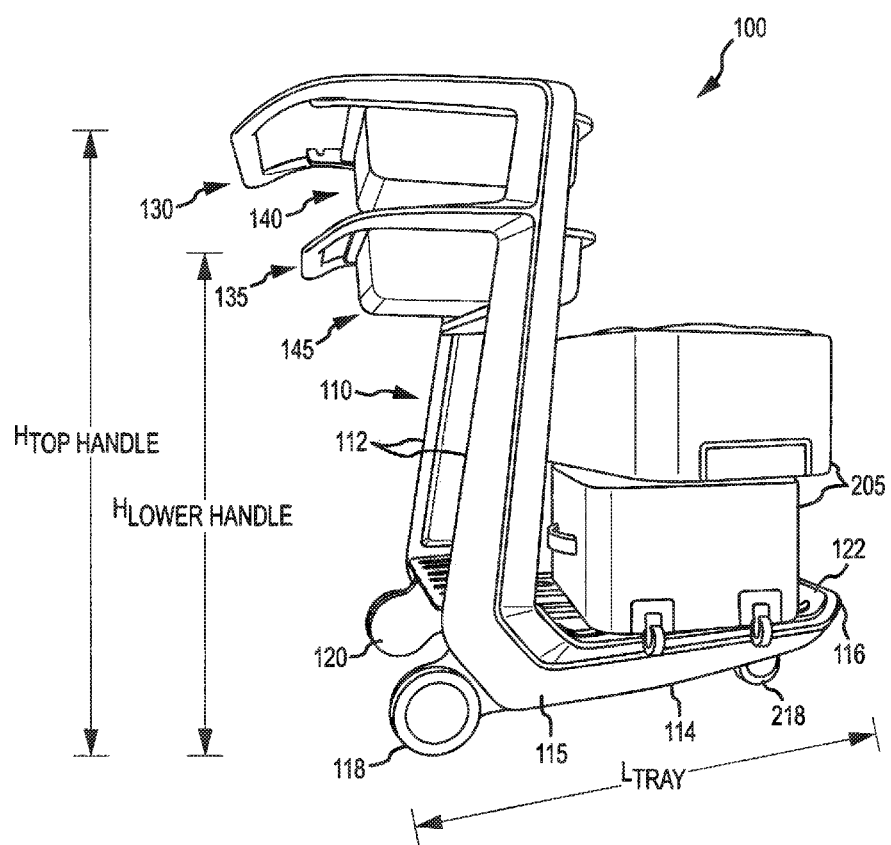
FIG. 2 is a side view of the cart of FIG. 1 with the lower tray loaded with a pair of carry-on bags.
Figure 3:
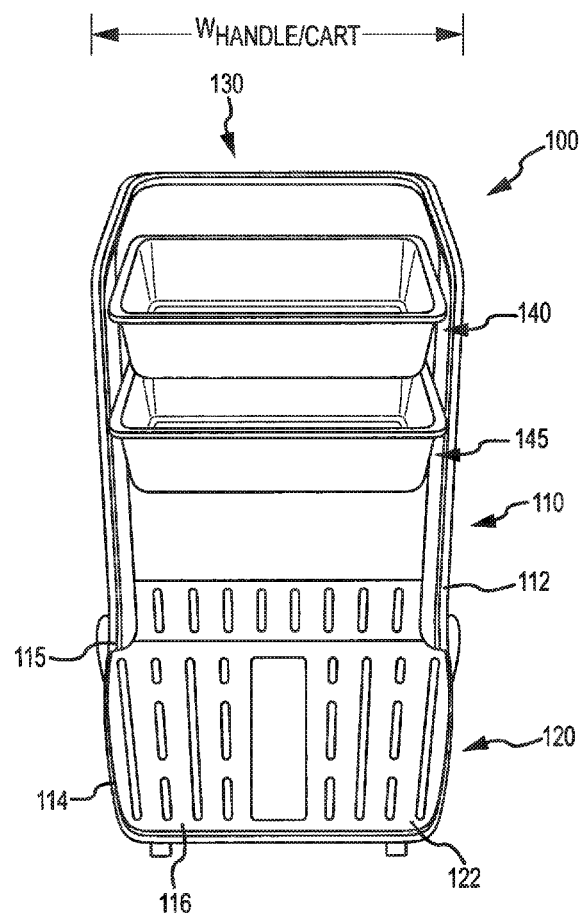
FIG. 3 is front view of the cart of FIGS. 1 and 2.

FIGS. 2 and 3 illustrate side and front views of the cart 100, respectively, with FIG. 2 showing the cart 100 loaded with carry-on bags or luggage 205. As shown, the positioning of the handles 130, 135 and supported bins 140, 145 rearward or horizontally offset from the luggage tray 120 is desirable as it facilitates placement of the bags 205 on the tray 120. It provides a vertical open space over the luggage tray 120 such that the luggage items 205 may be vertically positioned on the tray 120 rather than having to be loaded horizontally requiring a passenger to stoop or bend over to push their luggage into the cart 100. Further, two or more bags 205 can be positioned on the cart 100 with this open arrangement while still allowing far detachable attachment of bins 140, 145 and providing dual handles 130, 135 on the frame 110. The location of the handles 130, 135 and bags 205 on tray 120 also retains a center of gravity in a central location over the center of the tray 120 and lower horizontal support 114 and at or below a midpoint of the height of the vertical supports 112 (especially when two or fewer bags 205 are loaded onto cart 100).

FIG. 2 illustrates that the upper handle 130 has a height, $H_{Top\ Handle}$, that is somewhat greater than the height, $H_{Lower\ Handle}$, of the lower handle 135, with one embodiment utilizing heights of 41 and 31 inches respectively for the two handles 130, 135 to accommodate a large range of users/people. The length, $L_{Tray}$, of the tray 120 (which determines/defines the cart length) may vary in practice but typically will be selected to be large enough to allow a typical carryon bag to be placed onto the tray 120 with clearance for the bins 140, 145, e.g., the length, $L_{Tray}$, may be about 30 to 40 inches with 35 to 37 inches used in some implementations.

FIG. 2 also shows that the cart 100 includes a pair of forward wheels 218 attached to the lower surface of the horizontal support 114 of frame 110, and the wheels 218 may be attached for pivoting such as via a swivel mount to support 114 to enhance mobility and quick turning of the cart 100. FIG. 3 illustrates that the upper handle 130 may have a width, $W_{Handle}$, that is the same or somewhat greater (such as 1 to 4 inches or more) than the base 115 width, $W_{Rear}$. FIGS. 2 and 3 also illustrate that the stacking of the bins 140, 145 visually hides or shields contents of the lower bin 145, and a passenger/user may, therefore, feel more comfortable in placing some of their personal items in the lower bin 145 such with liquid containers and other personal items such as prescription drugs and toiletries.

FIG. 4 illustrates the cart 100 without any bins attached and as it may be modified to include a differing tray arrangement. Specifically, as shown, the cart 100 includes a luggage or lower tray/shelf 420 with a planar body having two side arms or plates separated by (or defining) a central opening or bumper receiving groove 429. The tray 420 includes a rear bumper 422 and a front plate or arm 424 that is pivotally 427 mounted to the front end 116 of the horizontal support 114 of frame 110 via axle or pin 426. A front lip or bumper 428 may extend outward from the front plate or arm 424 of the body of the tray 420. The bumpers 422, 428 may both extend upward and outward/away from the body of the tray 420 such as at an angle of 30 to 90 degrees (as measured from the plane passing through the body of tray 420).

The front bumper 428 typically would have a width that is less than the width of the receiving groove or opening 429 in the body of the tray 420 to facilitate nesting as is shown in FIG. 5. As shown, a number or set 590 of nested carts 100 may be pushed together with front bumpers 428 received in the grooves 429 and the tray 420 pivoted upward a small amount to allow the bumper 428 to be pushed up to the front plate/arm 424. The front and rear bumpers or lips 428, 422 are raised a height (such as 1 to 4 inches or the like) to hold any bags/luggage loaded onto the tray 420 in place and reduce the risk of its tipping or falling off of the tray 420. The lip 428 may also act as a protective bumper for any loaded luggage such that the bumper/lip 428 strikes objects or obstructions to the cart 100 rather than sides of the luggage/bags on cart 100.

As discussed above, the cart may include and be adapted for selectively attaching and removing one or more security/storage bins. FIG. 6 illustrates one embodiment of a bin 640 that may be used with a cart, such as cart 100 of FIGS. 1-5, for storing personal items divested from an aircraft passenger prior to a security screening checkpoint. The bin 640 has a planar base or bottom wall 642, a first pair of longer sidewalls 644, and a second pair of shorter sidewalls or endwalls 646 (that may join at rounded or orthogonal corners 647). The sidewalls 644, 646 extend upward from the edges of the base 642 to define a height or depth, $H_{Bin}$, of the bin 640, such as 4 to 6 inches or the like. The sidewalls 644 have a length, $L_{Bin}$, that defines the length of the bin 640, and the sidewalls 646 have a length, $W_{Bin}$, that defines the width of the bin 640. A range of each may be used such as a length, $L_{Bin}$, of 18 to 24 inches and a width, $W_{Bin}$, of 12 to 18 inches. In some cases, these dimensions are chosen to match a conventional TSA security bin such as 5 inch sidewall heights (or bin depth), a length of 21 inches, and a width of 15.5 inches. The bin 640 may also include an upper lip or shoulder 650 extending outward from the top edges of the sidewalls 644, 646, and the lip 650 may act as a handle for the bin 640 and be curved with a recessed surface (e.g., for receiving a user's fingers when they handle or pick up the bin 640 and place it in or take it out of a cart).

With this or similar bins 640, a cart may be provided with a bin attachment assembly that is adapted for selective or detachable mounting of the bin 640 to the cart frame. For example, FIGS. 7-9 illustrate one bin attachment assembly 720 useful for many cart configurations. As shown in FIG. 7, the bin attachment assembly 720 is attached to each of the two vertical supports 712 of a cart frame 710. Specifically, the assembly 720 includes first and second elongated rails or support arms 722, 723 affixed to an inner surface 713 of the vertical support 712 of the cart frame 710. As shown in FIG. 9, the two rails 722, 723 extend out a distance from the surface 713 (such as 2 to 5 inches or the like) and are spaced apart (such as 4 to 6 inches) to define a gap or space between the rails 722, 723 to allow a user/passenger to place their hand 907 between the rails 722, 723 to attach the bin 650 to the pin and to later remove the bin 640 from the assembly 720 by grasping the lip or bin handle 650.

In the assembly 720, an inner stop or end piece 724, 725 is provided on an inner end of each rail 722, 723 and spaced apart a distance (e.g., 0.5 to 2 inches or the like) to define a support surface or groove/slot 726, 727 for receiving the sidewall of the lip/handle 650 of the bin 640. The stops or end pieces 724, 725 may include upper and side sloped and/or curved surfaces to allow a sliding action to support front or rear loading and unloading of the bin 640 into and out of the groove 726, 727. Dome or other-shaped retainers 728, 729 may be provided on the rails 722, 723 across the grooves 726, 727 opposite the stops 724, 725, and the retainers 728, 729 may provide contact surfaces to contact and apply compressive/retaining forces upon an inserted rim or handle 650 during insertion into the groove/slot 724, 725 (and also upon removal so as to retain the bin 640 from moving vertically under normal or non-removal operations). The handle 650 typically is formed of a plastic that will flex and then elastically return to its original shape during such insertion and removal operations.

FIGS. 10-12 illustrate use of the bin attachment assembly 720 during three differing bin loading operations. As shown, a cart 1000 is provided that includes a cart frame 710 with vertical side supports 712 upon which the bin attachment assembly 720 is provided on an inner surface. The cart 1000 also includes an upper handle 1030 and a lower handle 1135 extending rearward from the vertical side supports 712 of cart frame 710 such as from mounting locations and/or surfaces on the supports 712 opposite the bin attachment assembly 720. The bin attachment assembly 720 is position on the vertical support 712 between the mounting locations/ends of handles 1030, 1135 in this embodiment (whereas in the cart 100, the attachment assembly provided bin supports on or near the horizontal arms of the handles 130, 135). Further, the cart 1000 is a single bin design rather than a stacked bin design as with cart 100, and only a single bin attachment assembly 720 is provided to support the bin 640.

FIG. 10 illustrates a top loading use of the cart 1000. As shown, the bin 640 is vertically lowered or dropped 1041 into position on the bin attachment assembly 720 (or its rails) by the user (e.g., a passenger) with their hands 907 fitting between the rails of assembly 720 while they are still gripping the handle or rim 650 of the bin 640. FIG. 11 illustrates a rear, sliding loading use of the cart 1000. As shown, the bin 640 is slid 1141 forward to engage the rails of the bin attachment assembly 720 with the sidewalls of the handle 650 inserted into and received within the grooves/slots 726, 727 between the stops 724, 725 and ends of rails 722, 723. Conversely, FIG. 12 illustrates a front, sliding loading use of the cart 100. As shown, the bin 640 is slid 1241 rearward into the cart 1000 with the grooves/slots 726, 727 receiving the sidewalls of the bin handle 650 such that the bin 640 is detachably supported or mounted within the cart 1000. Again, this would typically occur at a divestment station or location away from an airport security checkpoint. In some embodiments, the bin 640 is loaded into the cart 1000 with its longer sides extending across the width of the cart 1000 or between the inner surfaces of vertical supports 712, as this allows the cart 1000 to be shorter in length while still leaving an open space above much of the luggage tray.

In some embodiments, it may be desirable for the cart to be designed with unobstructed or direct lines of sight to all or nearly all portions of each security bin and to the luggage tray. For example, applications may be developed that allow the cart to be pushed through a scanner or to be placed upon a scanner for 3D X-ray scanning. In such cases, a cart design that avoids stacking of bins as was done on cart 100 may be desirable such that inspectors can more readily view divested items and carry-on luggage in scanned imagery. Further, it may be desirable for the locations of bins to be known by the inspector personnel and/or the scanning software such that bins and expected items in such bins can be more readily identified. For example, one bin may be particularly configured for laptop and other larger computers or electronic devices, one bin may be configured for smaller personal items such as coins, jewelry, and cellular phones/PDAs/wireless communication device, and the like, and another bin may be designated for use for larger items such as shoes and small liquid containers. The divestment process may involve loading these bins with particular personal items, and then inspection can be more effective and efficient.

Figure 13:
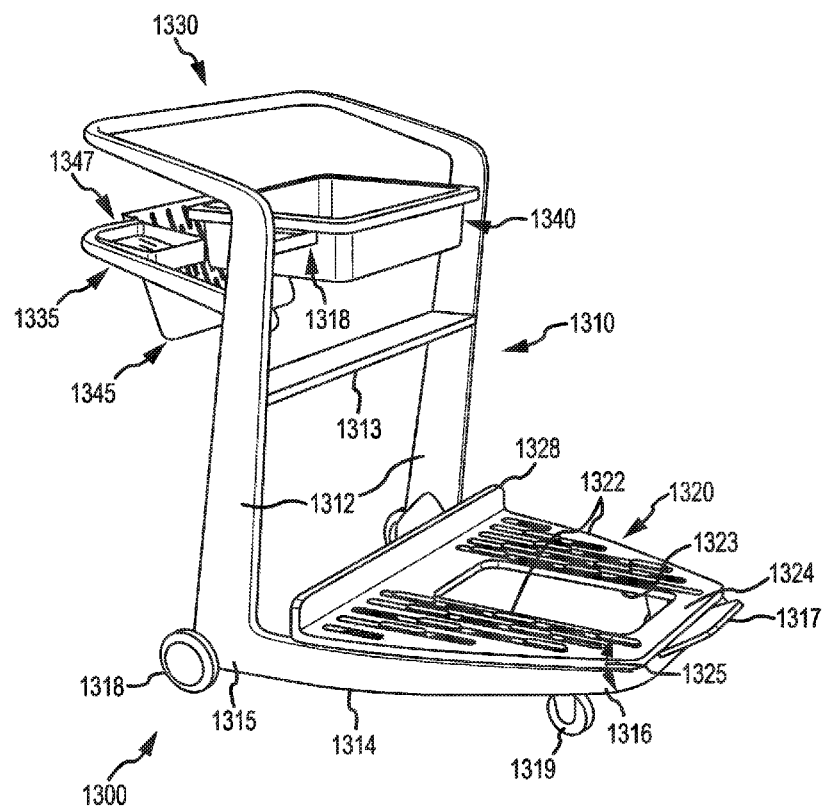
FIGS. 13 and 14 illustrate front and rear perspective views of another exemplary airport divestment and luggage cart of the present description configured with multiple, differing sized bins that may be rigidly affixed (e.g., for applications where the cart is allowed to pass directly through an airport scanning device) or detachably mounted to the cart frame.
Figure 14:
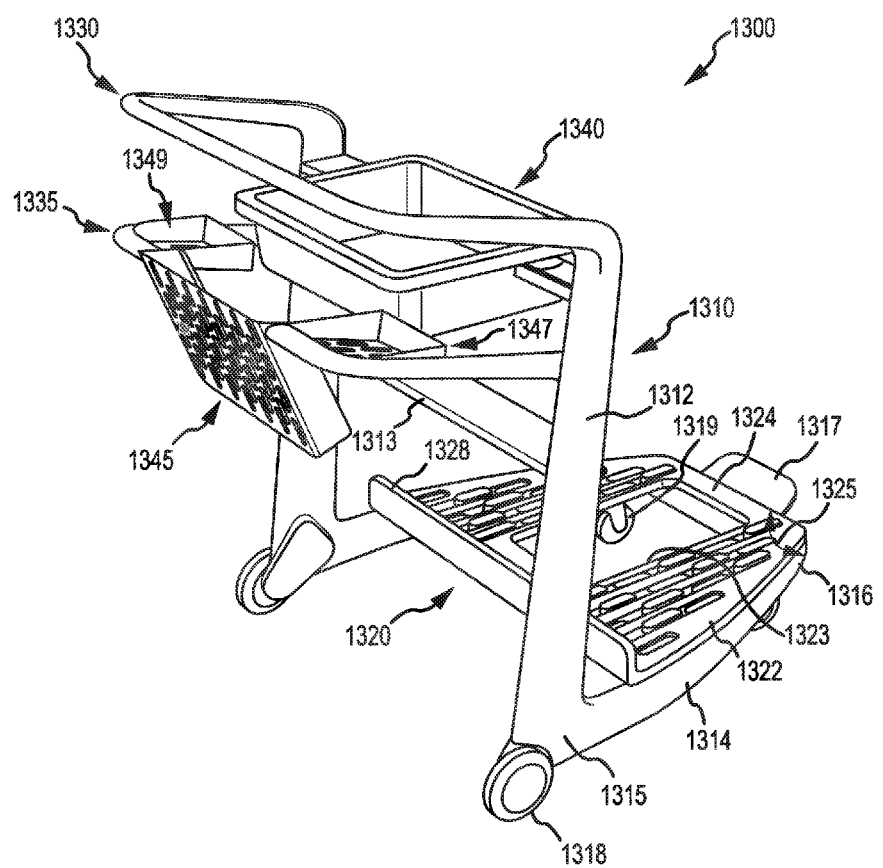

FIGS. 13 and 14 illustrate perspective front and rear side views of an airport divestment and luggage cart 1300 particular suited for use with 3D scanners adapted for receiving the cart 1300 without removal of the bins (although some embodiments may utilize detachable bins as were provided for cart 100). As with the cart 100, the luggage cart 1300 includes a frame 1310 that includes a pair of spaced apart vertical supports 1312 that are rigidly attached at a lower end to a rear or back end 1315 of a lower horizontal support or tray receiving member 1314. Wheels in the form of a stationary pair 1318 and a pivotal or swivel-mounted pair 1319 are provided on an underside of the horizontal support 1314.

In cart 1300, a rigid bumper or lip 1317 is provided on the forward end 1316 of the support 1314 for retaining luggage or bags placed on a tray or shelf 1320. The luggage tray 1320 is pivotally mounted as shown with arrow 1325 at a forward arm or plate 1324 to the forward end 1316 of the support 1314. The body of the tray 1320 includes side arms or plates 1322 extending the length of the tray 1320 with an opening or groove 1323 provided between the side plates/arms 1322 for receiving a bumper 1317 of another cart 1300 during nested storage/staging of the carts 1300. The tray 1320 further includes a rear stop or bumper 1328 opposite the bumper 1317 for retaining luggage or bags placed on the tray 1320. In this way, too, the luggage is retained in a known horizontal position, e.g., a horizontal position within the cart 1300 that is forward of the bins to provide an unobstructed view of the bags or other items placed on the tray 1320 as well as an unobstructed view from below of any bins placed above or at higher vertical locations than bags on the tray 1320.

The cart 1300 differs from the cart 100 in that it avoids stacking of bins to provide a direct vertical and, in most cases, side and other angled view of the bins to facilitate 3D scanning of the bins on the cart 1300. The frame 1310 includes a strut 1313 between vertical supports 1312 and a pair of bin attachment members 1318, which are used to attach bin 1340 in a rigid manner or in a detachable manner. It may be useful to allow the larger bin 1340 to be removed for filling at a divestment station even in cases where the cart 1300 is passed in tact (with bins) through a scanner. The bin 1340 may be a relatively large rectangular-shaped bin as shown (e.g., similar to conventional airport security bins) to receive larger items such as shoes, small liquid containers, and the like, and loose items such as coats/jackets removed from the passenger to pass through a metal detector.

As with cart 100, the bin 1340 is supported upon vertical supports 1312 so as to be in a horizontal position that is offset from all or a large portion of the tray 1320 such that an unobstructed view from above is provided of the tray 1320 and any bags placed on the tray 1320. As shown, the bin 1340 is positioned centrally between the two vertical supports near the top of the supports (e.g., between mounting locations for the two handles 1330, 1335) and extends rearward in a direction opposite to the tray 1320 (relative to the vertical supports 1312).

As with cart 100, dual handles are provided on the frame 1310 in the form of an upper handle 1330 and a lower handle 1335, both of which are rigidly affixed to and extend rearward from the vertical supports 1312. Significantly, the lower handle 1335 is configured to rigidly (or detachably in some embodiments) support several security or storage bins for use in placing personal or divested items. Particularly, the cart 1300 is shown to include a lower bin 1345 integral with the handle 1335 such as in the central portion of the handle 1335. This bin 1345 may be sized and shaped to receive a laptop or other similar full-sized electronic device that airport security typically requires be placed in a separate bin for scanning. The bin 1345 may be rectangular in shape and arranged vertically or at a steeper angle than bin 1340 to position the received laptop or electronic device on an end or angled upward rather than simply horizontal, which provides an unobstructed view but with a smaller footprint than if arranged horizontally as with bin 1340. The bin 1345 is shown to be wholly offset from the bin 1340 when viewed from above or below (e.g., the bins 1340, 1345 may appear to be adjacent or only slightly spaced apart when the cart is viewed in a plan view or from above).

The cart 1300 further includes smaller left and right side bins 1347, 1349 that are affixed to the lower handle 1335 (such as in the corners of the U-shaped handle 1335). These additional bins 1347, 1349 are also horizontally offset from bin 1340 as well as lower bin 1345 such that when the cart 1300 is viewed in a plan view or from above (or below) the upper bin 1340 does not overlap or block direct view of the bins 1347, 1349 and the bins 1347, 1349 do not overlap or block direct view of the lower bin 1345. In this manner, all four bins 1340, 1345, 1347, 1349 can readily be scanned with a 3D scanner configured to receive the cart 1300, e.g., on a conveyor belt or other cart transfer device adapted for engaging the cart 1300 and moving it through a scanner at a predefined rate.

Further, the frame 1310 including upper handle 1330 may be arranged to provide a limited obstruction or unobstructed view of the bins 1340, 1345, 1347, 1349 and tray 1320, and, to this end, the supports 1312 may be extend vertically upward from the horizontal support 1314 at the end 1315 at a location horizontally offset from back bumper 1328 of tray 1320 and the upper handle 1330 may be provided to be parallel to lower handle 135 and over none or only an edge of lower bin 1345. As with the cart 100, the cart frame 1310 and the bins 1340, 1345, 1347, 1349 may each be formed of materials compatible with ready and effective scanning by a typical 3D airport security scanner. For example, the cart and bins may be formed of one or more plastics, ceramics, or other material.

Although the invention has been described and illustrated with a certain degree of particularity, it is understood that the present disclosure has been made only by way of example, and that numerous changes in the combination and arrangement of parts can be resorted to by those skilled in the art.

We claim:

1. A cart for use carrying luggage and divested personal items through an airport, comprising:
    a cart frame including:
        a lower horizontal support,
        a set of wheels attached to a lower surface of the lower horizontal support,
        a luggage tray attached to an upper surface of the lower horizontal support,
        a pair of spaced apart vertical supports extending upward from the lower horizontal support, and
        for each of the vertical supports, a bin attachment assembly including two spaced apart rails extending outward from an inner surface of a corresponding one of the vertical supports, wherein each of the rails includes an upward facing groove; and
    an open-topped storage bin detachably coupled between the vertical supports to extend rearward away from the vertical supports and luggage tray, wherein the storage bin includes a handle that extends along at least two sides of the storage bin, wherein the upward facing groove of the rails of the bin attachment assembly receives the handle of the storage bin, whereby an open space is provided above the luggage tray.

2. The cart of claim 1, wherein the cart frame is formed of one or more plastics or ceramics.

3. The cart of claim 1, wherein the open-topped storage bin is rectangular in shape with four side walls and a base, the side walls extending upward a height of at least 3 inches to the handle.

4. The cart of claim 1, wherein the rails are spaced apart at least 4 inches and wherein the storage bin is positionable on the rails in a forward or rearward sliding manner and from above in a vertically downward lowering manner.

5. The cart of claim 1, further comprising a second one of the open-topped storage bins detachably supported by the vertical supports, wherein the storage bins are vertically stacked above each other on the cart.

6. The cart of claim 1, further comprising upper and lower handles extending outward from the vertical support and away from the luggage tray, wherein the upper and lower handles are spaced apart vertically at least 6 inches and wherein the cart further includes at least one storage bin attached to the lower handle.

7. The cart of claim 1, wherein a retainer is provided within each of the grooves of the rails and wherein the retainers are each adapted to contact and apply a retaining force upon the handle when the handle during insertion of the storage bin into the grooves, whereby the storage bin is detachably coupled to the cart frame and concurrently retained in place upon the pair of space apart vertical supports.

8. An airport divestment and luggage cart, comprising:
    a non-metallic frame including a pair of spaced apart vertical supports;
    a luggage tray with a planar body, the luggage tray supported upon the frame to be substantially orthogonal to, and extend outward in a first direction from, the vertical supports;
    a bin with an open top for receiving and retaining divested items from an aircraft passenger, the bin being horizontally offset from the luggage tray, whereby access unobstructed by the bin is provided to the luggage tray; and
    a bin attachment assembly rigidly affixed to each of the vertical supports and operative to receive the bin, wherein the bin is detachably supported between the vertical supports by the bin attachment assembly and wherein the bin is positionable on the bin attachment assembly in a forward or rearward sliding manner.

9. The cart of claim 8, further comprising an upper handle and a spaced apart lower handle both extending outward from the vertical supports in a second direction opposite the first direction.

10. The cart of claim 9, wherein the first and second handles are U-shaped and extend from the vertical supports in parallel planes and with substantial horizontal overlap when the cart is viewed in a plan view.

11. A luggage cart for use in an airport, comprising:
- a non-metallic frame with a vertical support, dual handles extending in a first direction from a first end of the vertical support, and a horizontal support extending from a second end of the vertical support in a second direction opposite the first direction; and
- a luggage tray with a planar body pivotally attached to the horizontal support via a first end of the body at a location distal to the vertical support, whereby the luggage tray is pivotal between a horizontal at rest position abutting the horizontal support to a cart-nesting position with a second end of the body spaced apart from the horizontal support,
- wherein a raised lip is provided on the luggage tray at the second end of the luggage tray,
- wherein a front bumper is provided on the first end of the luggage tray or on the horizontal support, and
- wherein the luggage tray further includes a bumper-receiving groove sized and shaped for receiving and limiting travel of the front bumper of an additional cart when the additional cart is nested within the luggage cart including causing the luggage tray to pivot upon the horizontal support.

12. The cart of claim 11, further comprising a pair of storage bins detachably attached to the frame in a stacked configuration and each adjacent to one of the dual handles, the storage bins being open-topped and rectangular in shape and horizontally offset from the luggage tray.

13. The cart of claim 11, further comprising a rectangular, open-topped bin supported on the vertical support proximate to the first end and to be horizontally offset from the luggage tray in a plan view of the cart.

14. The cart of claim 11, further comprising a thin rectangular bin attached to one of the dual handles, the thin rectangular bin horizontally offset from the luggage tray.

\* \* \* \* \*